July 10, 1945.　　　　　L. H. PECHER　　　　　2,380,328

FISH LURE

Filed Sept. 20, 1943

Lawrence H. Pecher
Inventor

By F. E. Channon
Attorney

Patented July 10, 1945

2,380,328

UNITED STATES PATENT OFFICE 2,380,328

FISH LURE

Lawrence H. Pecher, Akron, Ohio

Application September 20, 1943, Serial No. 503,039

7 Claims. (Cl. 43—42)

This invention relates to fish lures and aims to provide certain new and useful improvements therein.

Objects of the invention are to provide a fish lure of the spoon type which is provided with convenient means for securely attaching a strip of pork rind or the like thereto to form an attractive, very effective pork rind bait.

Other objects are to provide a fish lure of strong, durable construction, which can be manufactured at a low cost and which is provided with a particular arrangement of inclined surfaces and fins, which, when the lure is drawn through the water, will simulate the wobbling, darting motion of a live object.

Further objects are to provide a bait of the character above indicated which when reeled at an ordinary speed will travel a short distance below the surface of the water, but which, by fast reeling, can be made to travel on the surface, and to provide a bait which has a tendency to fall through weeds, pass through rushes, and over spatter docks and like obstructions without being caught; and which when struck will hook the fish in the upper jaw where it can not easily be shaken off or disengaged.

The above and additional objects and advantages are attained by the novel construction and arrangement of parts hereinafter described with reference to the accompanying drawing in which there is illustrated an embodiment of the invention, it being understood that changes and modifications can be made which come within the scope of the claims hereunto appended.

Figure 5:
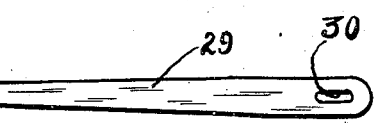
Figure 5 is a plan view of a blank, with dotted lines showing the lines on which it is stamped or bent to form the main body of my improved lure.
Figure 7:
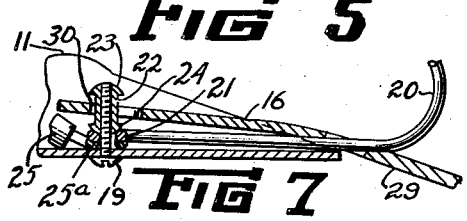
Figure 7 is an enlarged fragmentary cross-section, partly broken away, taken substantially on line 7—7 of Figure 2 but showing the pork rind strip attached.

In the adaptation of the invention shown in the drawing, the main body of the lure is formed from sheet material, preferably a bright sheet metal. In Figure 5, there is illustrated a blank of cordate form having a wide forward edge provided with a notch 9. The blank tapers from the forward portion thereof to a pointed rear end 8. The medial line 12 of the blank extends from the notch 9 to the point 8. The dotted lines 13 and 14 denote lines on which the blank is bent to provide the surfaces and fins hereinafter described. The blank is bent upwardly along the medial line 12 at an obtuse angle to form the side portions 15 and 16 (see Figures 1 to 4). The blank is further bent upwardly on the lines 13 and 14 to form upwardly projecting fins or lobes designated by the numerals 10 and 11.

The body thus formed is of elongated diamond shape with one apex of the diamond terminating at the forward end thereof in the notch 9.

The portions 15 and 16 slope upwardly from the medial line 12 to form an obtuse angle and the fins or lobes 10 and 11 project upwardly at a forward inclination which positions the forwardly presented edges of said fins in closely spaced relation and forms a gap for the line fastening device hereafter described.

The body is provided on the medial line thereof intermediate the length thereof with an aperture 18 in which is secured a post 19. The post 19 projects upwardly from the upper face of the body and is entered in the eye 21 of the hook 20.

As shown in the drawing, the post 19 is in the form of a screw which is threaded into a nut 22. The nut 22 is provided with a head 23 and a circumferentially extending flange 24 which is spaced downwardly from the head 23 and bears against the eye 21 to hold the hook 20 securely in place.

The shank of the hook 20 extends rearwardly along the medial line 12 and projects beyond the point 8 with the hook proper curving upwardly and forwardly and terminating in a forwardly projecting sharp barbed end portion 20a.

The numeral 25 denotes a swivel having an eye 25a in which the post is secured. The swivel projects forwardly along the medial line of the body and a second swivel 27 is secured thereto by a connecting link 28, the double swivel connection extending through the gap between the fins 10 and 11.

Figure 1:
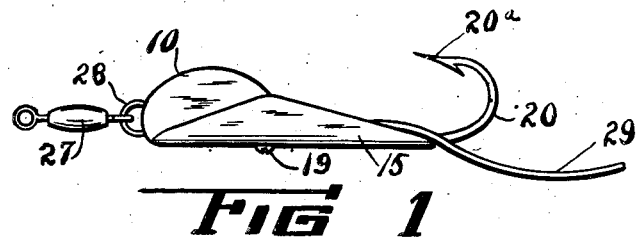
Figure 1 is a side elevational view of a fish lure constructed in accordance with this invention.
Figure 2:
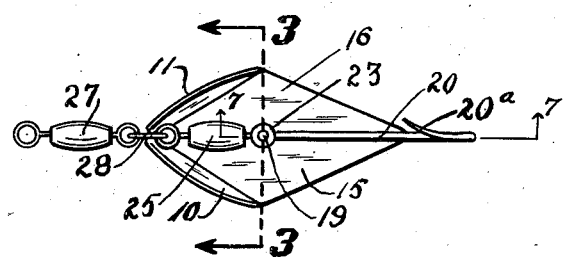
Figure 2 is a top plan view thereof, the same being shown without the pork rind strip.
Figure 3:
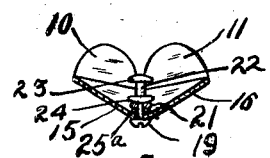
Figure 3 is a cross-sectional view taken as indicated by the line 3—3 of Figure 2.
Figure 4:
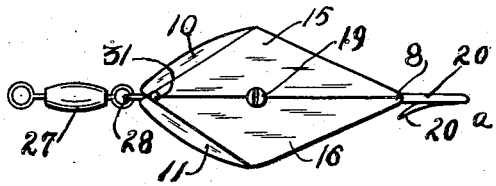
Figure 4 is a bottom plan view of the improved lure constructed in accordance with this invention.
Figure 6:
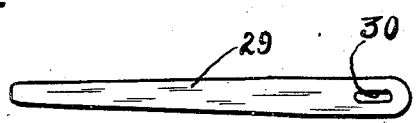
Figure 6 is a plan view illustrating the pork rind strip employed in carrying the invention into effect.

A strip of pork rind 29 having an aperture 30 to receive the post 19 is positioned thereon and pierced by the hook as shown in Figure 1.

As shown in Figure 5, the blank may be provided adjacent the notch 9 with an aperture 31 which may be used to connect a swivel or line directly to the main body of the bait.

It will thus be seen that this invention provides an attractive bait which may be used with or without a pork rind, which may be manufactured at a low cost and will be very effective in use.

Having thus illustrated my invention and described the same in detail, what I claim as new and desire to secure by Letters Patent is:

1. In a fish lure of the character described a substantially diamond shaped body of sheet material having the acute angled ends thereof forming the front and rear ends thereof, said body extending upwardly on a medial line extending between said ends with the lateral halves of the body disposed at an obtuse angle to each other; a fin projecting upwardly from each of the forwardly presented edges of said body; a post projecting upwardly from the medial line of said body at a point intermediate the length thereof; means for attaching a line to said body; a hook anchored to said post and extending rearwardly along said medial line with the hook proper curving upwardly and forwardly and terminating in a forwardly presented barbed end portion, and means on said post for retaining an auxiliary lure thereon.

2. In a fish lure of the character described a substantially diamond shaped body of rigid sheet material having the acute angled ends thereof forming the forward and rear ends thereof; said body extending upwardly on a medial line extending between said ends with the lateral halves of the body disposed at an obtuse angle to each other; a fin projecting upwardly at a forward inclination from each of the two forwardly presented edges of said body; a post projecting upwardly from the medial line of said body at a point intermediate the length thereof; means for attaching a line to said body; and means for attaching a hook to said post to project beyond the rear end of the body; said post being provided with a headed extension for retaining an auxiliary lure thereon.

3. In a fish lure of the character described, a substantially diamond shaped body of sheet material having an acute angled end thereof forming the forwardly presented end of the lure and the other acute angled end thereof forming the rear end thereof, said body extending upwardly on a medial line extending between said ends with the lateral halves of the body disposed at an obtuse angle to each other; a fin projecting upwardly at a forward inclination from each of the two forwardly presented edges of said body; a post projecting upwardly from the medial line of said body at a point intermediate the length thereof; means for attaching a line to said body, and a hook secured to said post with the shank thereof disposed along said medial line and projecting beyond the rear end of the body; said shank curving upwardly and forwardly and terminating in a forwardly presented barbed end portion.

4. In a fish lure of the character described a substantially diamond shaped body of sheet material having an acute angled end thereof forming the forwardly presented end of the lure and the other acute angled end thereof forming the rear end thereof, said body extending upwardly on a medial line extending between said ends with the lateral halves of the body disposed at an obtuse angle to each other; an arcuate fin projecting upwardly at a forward inclination from each of the two forwardly presented edges of said body; a headed post projecting upwardly from the medial line of said body at a point intermediate the length thereof; means for attaching a line to said body; and means for attaching a hook to said post to extend rearwardly of the body.

5. In a fish lure, a body formed of a cordate blank, having one lateral portion thereof sloping upwardly at an obtuse angle to the other lateral portion thereof and having lobe portions; the lobe portions of said blank turned upwardly to form forwardly inclined fins; a post projecting upwardly from the medial line of said body at a point intermediate the length thereof; a hook secured to said post, the shank of said hook projecting rearwardly on the upper face of said body beyond the rear end thereof; said shank terminating in a hook which is curved upwardly and forwardly with the barbed point portion thereof directed toward the forward end of the body, and means for attaching a line to said body.

6. In a fish lure, a body formed of a cordate blank, having one lateral portion thereof sloping upwardly at an obtuse angle to the other lateral portion thereof and having lobe portions; the lobe portions of said blank turned upwardly to form forwardly inclined laterally diverging fins; a post projecting upwardly from the medial line of said body at a point intermediate the length thereof, means for attaching a line to said body; a hook secured to said post, the shank of said hook projecting rearwardly on the upper face of said body beyond the rear end thereof; said shank terminating in a hook which is curved upwardly and forwardly with the barbed point portion thereof directed toward the forward end of the body and means on the upwardly projecting end of said post for retaining an auxiliary bait thereon.

7. A fish lure comprising a body of substantially diamond shape in plan view and having portions on opposite sides of a medial longitudinal line thereof at an obtuse angle to each other, the forward acute angled portion of the body having at its forward edges upwardly extending parts which diverge rearwardly from the medial line of the body, and means along the medial line of the body for securing a line thereto.

LAWRENCE H. PECHER.